United States Patent
Perry et al.

(10) Patent No.: US 12,410,729 B2
(45) Date of Patent: Sep. 9, 2025

(54) PRE-CERAMIC THERMAL BARRIER FOR GAS TURBINE ENGINE COMPONENTS

(71) Applicant: Raytheon Technologies Corporation, Farmington, CT (US)

(72) Inventors: Connor C. Perry, West Hartford, CT (US); Xiaomei Fang, South Glastonbury, CT (US); Bradley L. Paquin, Cheshire, CT (US); Jacob Yochimowitz, East Haddam, CT (US); Sushruth G. Kamath, Manchester, CT (US); Jun Cao, Scarsdale, NY (US)

(73) Assignee: RTX Corporation, Farmington, CT (US)

(*) Notice: Subject to any disclaimer, the term of this patent is extended or adjusted under 35 U.S.C. 154(b) by 10 days.

(21) Appl. No.: 17/961,987

(22) Filed: Oct. 7, 2022

(65) Prior Publication Data
US 2024/0117754 A1    Apr. 11, 2024

(51) Int. Cl.
*F01D 25/28* (2006.01)
*C23C 4/11* (2016.01)
*F01D 9/02* (2006.01)
*F01D 25/00* (2006.01)
*F01D 25/08* (2006.01)
*F01D 25/14* (2006.01)

(52) U.S. Cl.
CPC ............ *F01D 25/005* (2013.01); *F01D 9/02* (2013.01); *F01D 25/08* (2013.01); *F01D 25/145* (2013.01); *F05D 2220/32* (2013.01); *F05D 2230/31* (2013.01); *F05D 2240/10* (2013.01); *F05D 2240/128* (2013.01); *F05D 2240/14* (2013.01); *F05D 2240/15* (2013.01); *F05D 2260/231* (2013.01); *F05D 2300/211* (2013.01)

(58) Field of Classification Search
None
See application file for complete search history.

(56) References Cited

U.S. PATENT DOCUMENTS

| | | |
|---|---|---|
| 9,777,585 B2 | 10/2017 | Drane |
| 10,569,481 B2 | 2/2020 | Gallier et al. |
| 10,641,178 B2 | 5/2020 | Corradini et al. |
| 2008/0213604 A1* | 9/2008 | Whiteker ............ B32B 27/08 428/451 |
| 2009/0130424 A1 | 5/2009 | Tholen et al. |

(Continued)

FOREIGN PATENT DOCUMENTS

| | | |
|---|---|---|
| EP | 2017072 B1 | 7/2019 |
| EP | 3913189 A1 | 11/2021 |
| WO | 98/56574 A1 | 12/1998 |

OTHER PUBLICATIONS

Extended European Search Report dated Feb. 6, 2024 issued in corresponding application EP23201951.3.

*Primary Examiner* — David E Sosnowski
*Assistant Examiner* — Maxime M Adjagbe
(74) *Attorney, Agent, or Firm* — Bachman & LaPointe, P.C.

(57) ABSTRACT

A gas turbine engine component includes a structural component having a surface, the structural component having an organic matrix composite material; and a cured thermal barrier layer on the surface, wherein the cured thermal barrier layer is a pre-ceramic layer including inorganic matrix containing silicon oxides reinforced with glass or quartz fibers.

14 Claims, 4 Drawing Sheets

(56) References Cited

U.S. PATENT DOCUMENTS

| | | | |
|---|---|---|---|
| 2016/0236995 A1* | 8/2016 | Lai | B32B 18/00 |
| 2017/0015600 A1* | 1/2017 | Schaedler | C04B 41/52 |
| 2017/0292402 A1* | 10/2017 | Barron | F01D 25/24 |
| 2017/0348876 A1 | 12/2017 | Lin et al. | |
| 2017/0370246 A1* | 12/2017 | Olver | B29C 66/73755 |
| 2019/0085790 A1* | 3/2019 | Dievart | F02K 3/04 |
| 2019/0093499 A1* | 3/2019 | Sippel | F01D 11/122 |
| 2021/0062717 A1 | 3/2021 | Saripella et al. | |
| 2021/0156275 A1* | 5/2021 | Whittle | F01D 25/246 |

\* cited by examiner

(12) United States Patent

PRE-CERAMIC THERMAL BARRIER FOR GAS TURBINE ENGINE COMPONENTS

BACKGROUND

The present disclosure relates to organic matrix composite components of gas turbine engines.

Organic matrix composites (OMC) are in wide use for manufacture of components of industrial machines such as gas turbine engines. OMCs provide unique advantages in weight savings and performance durability over metals. One class of OMC of interest is polyimide composites. These composites offer very high temperature capabilities among OMCs, and are limited to a maximum use temperature of less than 600° F. due to reduction in mechanical properties in thermal humidity environments. However, in some settings, engines can require transient temperature exposures to 600° F. and above, which present challenges to the mechanical integrity and the oxidation resistance of the polyimide composites.

Increasing a maximum use temperature of the composite parts such as polyimide composite parts is of continued interest.

SUMMARY

The present disclosure relates to thermal barrier layers for OMC components of industrial machines such as gas turbine engines and the like. Introducing a thermal barrier material with good bonding, matching coefficient of thermal expansion, low thermal conductivity and higher temperature capabilities can be an effective way to increase OMC temperature capabilities for composite components encountering through-thickness thermal gradients in service. The relatively low thermal conductivity and low density of the barrier material can also reduce the weight penalty by including thermal barrier coatings.

In one configuration, a gas turbine engine component comprises a structural component having a surface, the structural component comprising an organic matrix composite material; and a cured thermal barrier layer on the surface, wherein the cured thermal barrier layer is a pre-ceramic layer comprising inorganic matrix containing silicon oxides reinforced with glass or quartz fibers.

In another non-limiting configuration, wherein the pre-ceramic layer comprises a prepreg of glass or quartz fiber reinforced inorganic silicon oxides based matrix.

In still another non-limiting configuration, the thermal barrier layer comprises a ply schedule having a continuous layer of pre-ceramic fiber in contact with the surface.

In a further non-limiting configuration, the ply schedule defines the thermal barrier layer having zones of different thickness.

In a still further non-limiting configuration, the thermal barrier layer has a thermal conductivity of less than about 0.4 W/mK.

In another non-limiting configuration, the thermal barrier layer has a thermal conductivity of less than about 0.35 W/mK.

In still another non-limiting configuration, the thermal barrier layer has different thicknesses in different locations on the surface.

In a further non-limiting configuration, the surface defines at least a portion of a gas flow path of a gas turbine engine, and wherein the thermal barrier layer is positioned to be in contact with the hot gas flow path.

In a still further non-limiting configuration, the component comprises a case or duct of a gas turbine engine.

In another non-limiting configuration, the component comprises a gas flow path of a stator.

In still another non-limiting configuration, the component comprises a nozzle part of a gas turbine engine.

In a further non-limiting configuration, the nozzle part comprises external flaps or a nozzle static structure cover.

In a still further non-limiting configuration, the engine component further comprises a glass or quartz fiber reinforced composite layer between the component and the thermal barrier layer.

In another non-limiting configuration, the organic matrix composite comprises at least one of polyimide composite, bismaleimide composite, and combinations thereof.

In still another non-limiting configuration, the organic matric composite is thermosetting polyimide composite.

In another configuration, a method for providing a component of a gas turbine engine with a thermal barrier layer comprises positioning a pre-ceramic thermal barrier layer on a surface of a structural organic matrix composite component; curing the thermal barrier layer before or after the positioning step to produce a cured thermal barrier layer; and placing the component in service, whereby the cured thermal barrier layer increases a temperature to which the component can be exposed.

In a further non-limiting configuration, the curing step comprises co-curing the component and the thermal barrier layer after the positioning step.

In a still further non-limiting configuration, the curing step comprises curing the thermal barrier layer before the positioning step.

In another non-limiting configuration, the positioning step comprises bonding the thermal barrier layer to the surface with an adhesive.

In still another non-limiting configuration, the organic matrix composite component comprises a thermosetting polyimide matrix composite component.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

The disclosure relates to increasing the maximum temperature rating of organic matrix composite (OMC) components of gas turbine engines. As disclosed herein, a pre-ceramic thermal barrier layer can be applied to the hot surfaces of such components and thereby increase the maximum temperature rating of the component. By the hot surfaces is meant surfaces that are exposed to high temperature during operation, most frequently surfaces or areas that are exposed to hot gas flow in the gas turbine engine, particularly components that, in use, experience a through-thickness thermal gradient.

As disclosed herein, such surfaces are provided with a thermal barrier layer of protection that increases the temperature to which the surface with such a thermal barrier layer can be exposed. The thermal barrier layer of protection as disclosed herein is a pre-ceramic thermal barrier layer, the various aspects and uses of which are disclosed herein.

Figure 1:
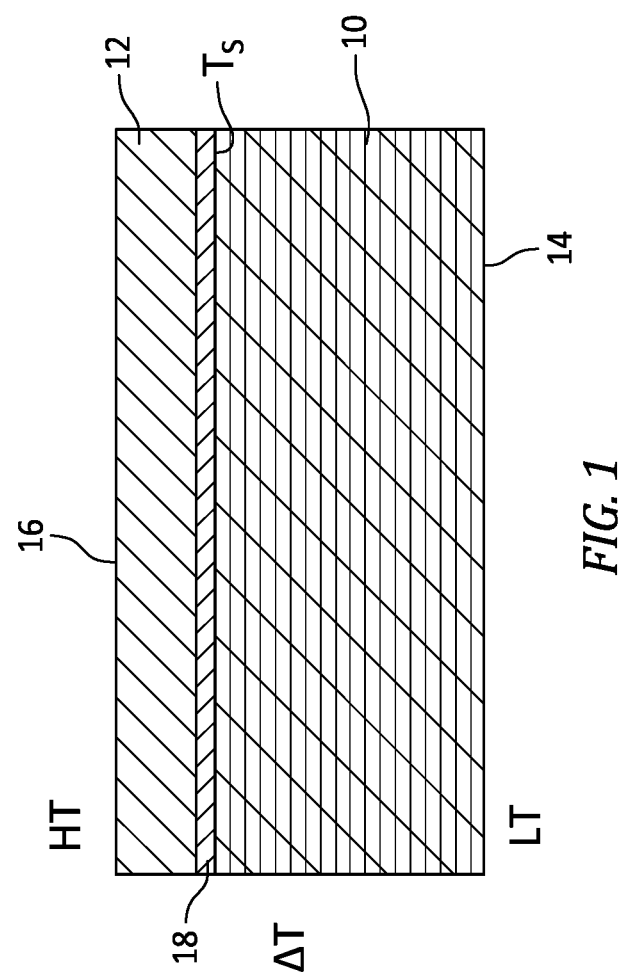
FIG. 1 schematically illustrates an organic matrix composite component having a pre-ceramic thermal barrier layer according to one non-limiting configuration of the disclosure.

FIG. 1 schematically illustrates a component 10 having a thermal barrier layer 12. Thermal barrier layer 12 is configured to have a lower thermal conductivity and higher temperature capability than OMC components and thereby increases the maximum temperature to which the component with barrier can be exposed.

Component 10 can be any of numerous different components of a gas turbine engine. Non-limiting examples include engine cases, ducts, stators, nozzle components and the like. In use, these components have one or more hot surfaces which can be exposed to high temperature, for example including surfaces exposed to engine gas flow path. These components can also have one or more cold surfaces which are surfaces that face away from the hot surface. It should be appreciated that other components of gas turbine engines and other industrial machines can also benefit from the thermal barrier layer disclosed herein.

The hot surfaces of these components are a point of interest for use of the pre-ceramic thermal barrier layer as disclosed herein. Non-limiting examples of areas or hot surfaces where such a layer can be applied include surfaces of the engine case or ducts that are exposed to the engine gas flow path, inner and/or outer diameter flow paths of a stator, flow surfaces of the shroud, nozzle parts such as external flaps, nozzle static structure cover and the like.

Component 10 can be manufactured from organic matrix composite (OMC) material which, as set forth above, is a desirable material due to suitable properties and light weight. Non-limiting examples of suitable OMC material for the component include polyimide composite, bismaleimide (BMI) composite and the like, and thermosetting polyimide is particularly well suited due to its temperature resistant qualities.

The OMC material can be fabricated into the component in numerous ways which would be known to a person skilled in the art. One non-limiting example of a fabrication method is fashioning the component as a structural ply schedule of OMC material, for example comprising structural carbon fiber and polyimide resin.

As set forth above, typical OMC materials have a maximum use temperature. For example, with polyimide composite there is a maximum use temperature of about 550 or 600° F. depending upon various factors. In order to increase the temperature to which the component can be exposed, thermal barrier layer 12 is applied.

As disclosed herein, the thermal barrier layer 12 is a pre-ceramic layer or inner skin, which is applied to a hot surface of component 10. Thermal barrier layer 12 can be a pre-ceramic prepreg, for example a glass or quartz fiber reinforced silicone-based matrix. When cured, thermal barrier transforms into a pre-ceramic layer comprising inorganic matrix containing silicon oxides reinforced with glass or quartz fibers. Under expected conditions, such a material has a desirable low thermal conductivity, for example less than 0.4 W/mK or even less than 0.35 W/mK. Depending upon thickness of the barrier layer to be applied, this can reduce the temperature to which the underlying component surface (OMC material) is exposed by as much as 100° F. or more, thereby increasing the maximum temperature to which the component with thermal barrier layer can be expose during use.

FIG. 1 illustrates component 10 having a low temperature side 14 which, in typical conditions in a gas turbine engine, might be exposed to a temperature of about 300° F. Component 10 also has a high temperature side 16, the side typically facing higher temperature conditions such as gasses from the engine flow path. As disclosed herein, high temperature side 16 is a surface to which thermal barrier layer 12 can be applied, and this allows the high temperature side of the component with the barrier layer to be exposed to higher temperatures, for example temperatures of greater than 600° F. Such components therefore have a through-thickness thermal gradient illustrated in FIG. 1 as $\Delta T$ between the high temperature (HT) conditions and the low temperature (LT) conditions. The hot surface conditions can be acceptable as long as thermal barrier layer 12 has a thickness and sufficiently low thermal conductivity to keep the temperature at the interface, shown at Ts along the through-thickness gradient illustrated in FIG. 1, at or below the rating of the OMC material. Assuming polyimide composite, in this example the thermal barrier layer should have thickness sufficient to limit the temperature at Ts to less than 600° F. These temperatures can vary based upon the specific materials and operating conditions.

Thermal barrier 12 is referred to herein as pre-ceramic because it is fabricated from a pre-ceramic material, for example a glass or quartz fiber reinforced silicone based matrix. Thermal barrier 12 can be fabricated from a silicone resin matrix supporting, for example, a polysiloxane based resin matrix that may contain a certain amount of silica or other passive fillers. Thermal barrier 12 can be formed into a layer or skin that can then be applied in appropriate locations to an OMC component. Thermal barrier 12 is eventually cured, either before application to the component, or after application to the component in a co-curing process. The curing process of the pre-ceramic thermal barrier transforms or partially transforms the material to inorganic form and into a ceramic that is cured at least up to the temperatures to which the component may be exposed. Once cured, thermal barrier 12 comprises glass or quartz fiber reinforcement, amorphous silica and may include partially converted or oxidized polysiloxane polymers.

As set forth above, the cured barrier material provides a through-thickness thermal conductivity less than 0.4 W/mK, a density less than 3.0 g/cm$^3$, continuous glass or quartz fiber reinforcement, thermal stability with no chemical degradation above 700° F., no damage under thermal humidity exposure and fluid exposure, including but not limited to ethylene glycol, jet fuel, motor oil, acetone, isopropanol, and integrity of barrier layer and OMC composite joint over a temperature range from −65° F. to 550° F. or above. The barrier layer can be fabricated as a schedule of plies or layers defining the overall barrier thickness. The barrier thickness can be tailored with fiber reinforcements with different ply thickness. The thickness of the thermal barrier layer can be selected to provide a desired amount of additional temperature to which the component can be exposed. For example, as set forth herein, the barrier thickness can be tailored with fiber reinforcements with different ply thickness, a relatively thin thermal barrier layer, for example having a thickness of between 10 mil and 30 mil may provide a delta T or temperature increase under steady state conditions of about 50 to 80° F., while a thicker thermal barrier layer, for example having a thickness of between 40 mil and 60 mil may provide a delta T or temperature increase under steady state conditions of about 100° F. or higher. The delta T referred to herein can be considered to be the temperature difference between the hot side surface of the thermal barrier at steady state, and the temperature at underlying location Ts. As set forth above, for a material wherein Ts may be kept at or below 550° F., depending upon the thickness and material of the thermal barrier, the hot side surface of the thermal barrier on the component can be exposed to temperatures of 600 or even 700° F.

Still referring to FIG. 1, in one non-limiting configuration, an intermediate layer 18 can be provided between component 10 and thermal barrier layer 12. Intermediate layer 18 can be a glass or quartz fabric-based polyimide composite layer sandwiched between the structural carbon polyimide of component 10 and thermal barrier layer 12. Intermediate layer 18 serves to provide additional thermal insulation for the structural carbon polyimide component.

Figure 2:
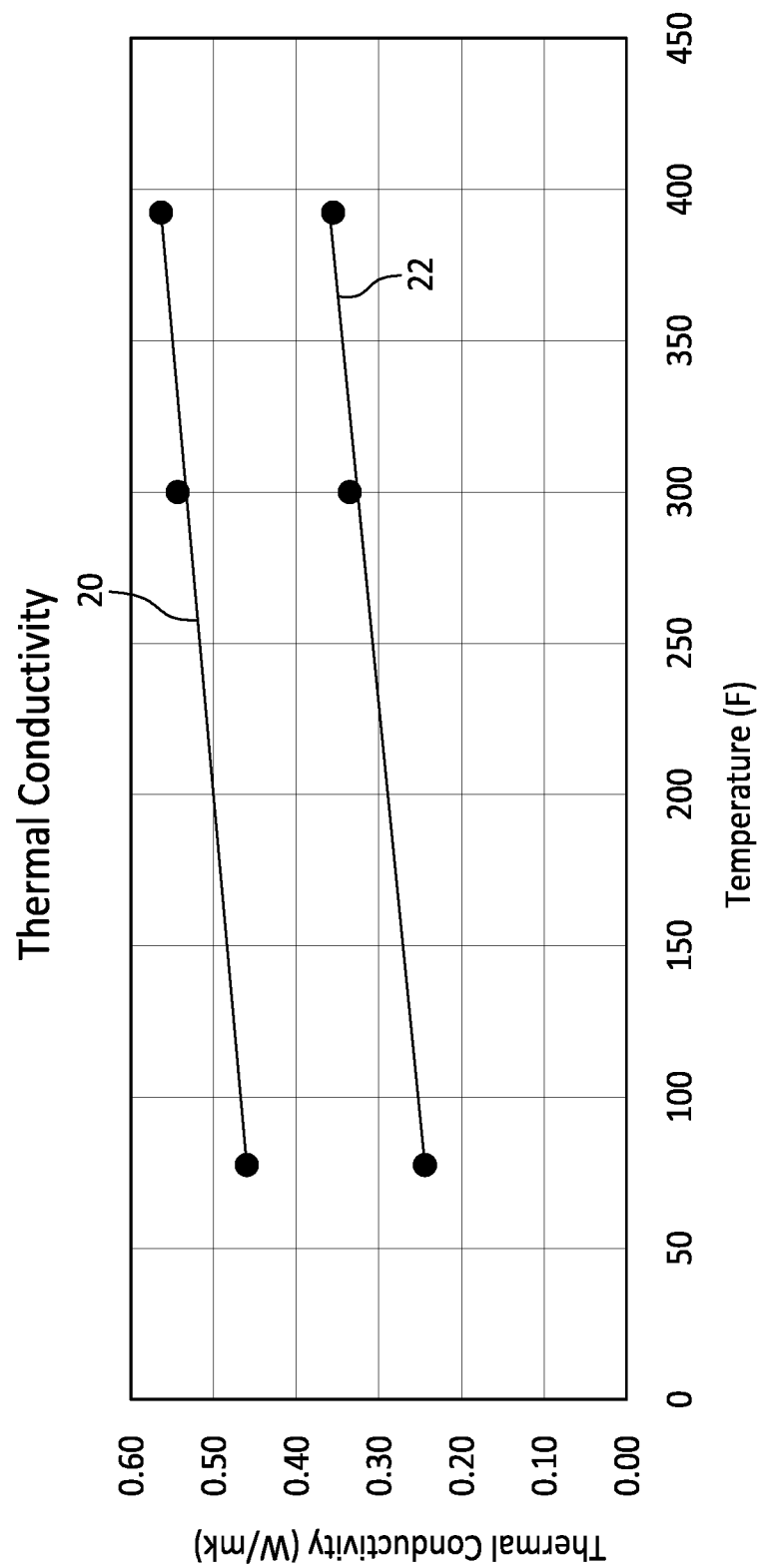
FIG. 2 illustrates thermal conductivity of a typical organic matrix composite material and that of preceramic thermal barrier material as disclosed herein.

FIG. 2 illustrates the relationship between thermal conductivity and temperature for typical material of the component, shown at line 20, and a pre-ceramic prepreg with glass fiber reinforced silicone matrix, shown at line 22. As shown, although the thermal conductivity for both materials gradually increases with temperature, thermal conductivity for the thermal barrier layer material is significantly lower than that of the component material as desired.

Figure 3:
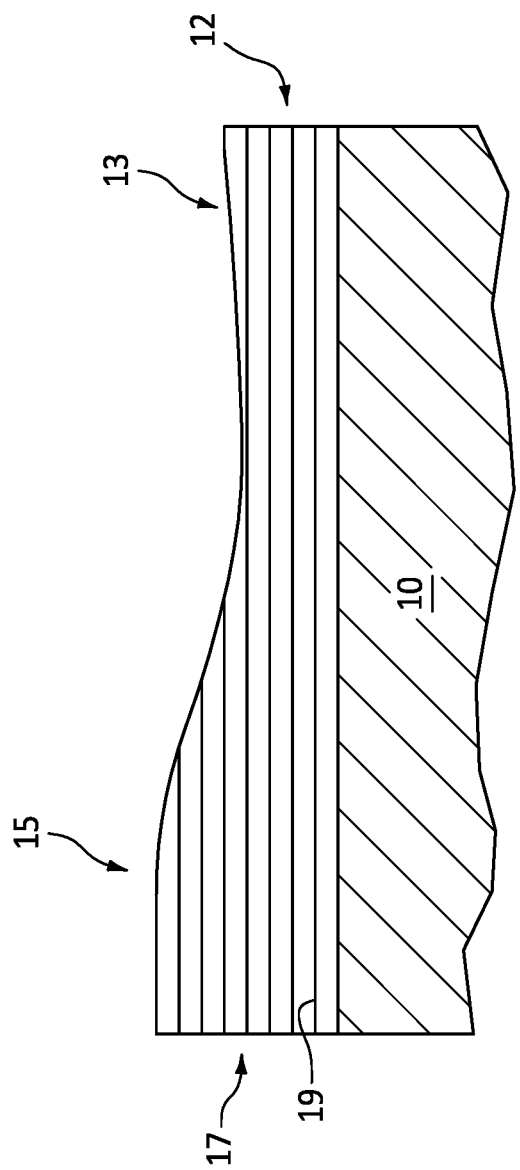
FIG. 3 illustrates a component with thermal barrier layer with plies defining different thicknesses.

As set forth above, thermal barrier layer 12 can be provided having different thicknesses at different locations of the surface of the component to be protected or shielded. FIG. 3 schematically illustrates such a configuration, wherein zone 13 is a relatively thin portion of layer 12, and zone 15 is a relatively thicker portion of layer 12. This can be provided by designing a schedule or structure of plies 17 of layer 12, with more plies being used in order to create the desired areas of greater thickness. In this configuration, layer 12 is designed such that at least one continuous ply 19 is in contact with the underlying component 10, with potentially smaller dimensioned plies being stacked away from component 10 as shown in FIG. 3.

Figure 6:
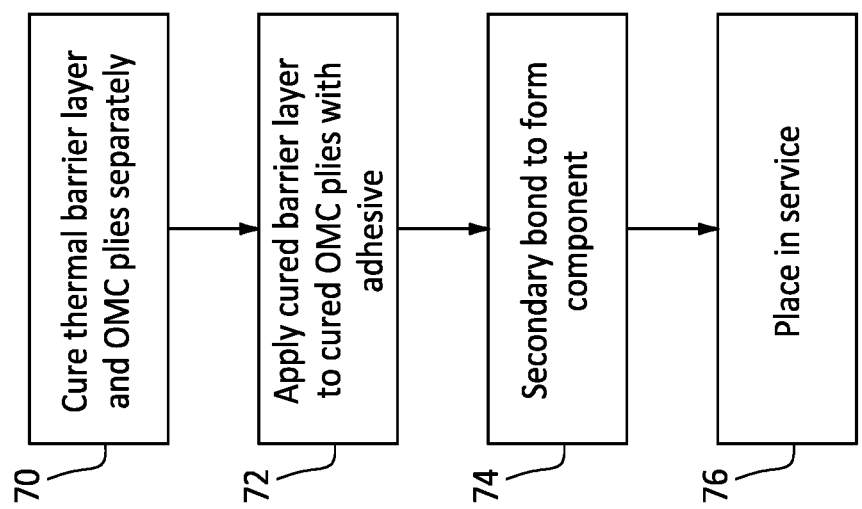
FIGS. 4-6 schematically illustrate methods for applying the thermal barrier layer as disclosed herein.
Figure 5:
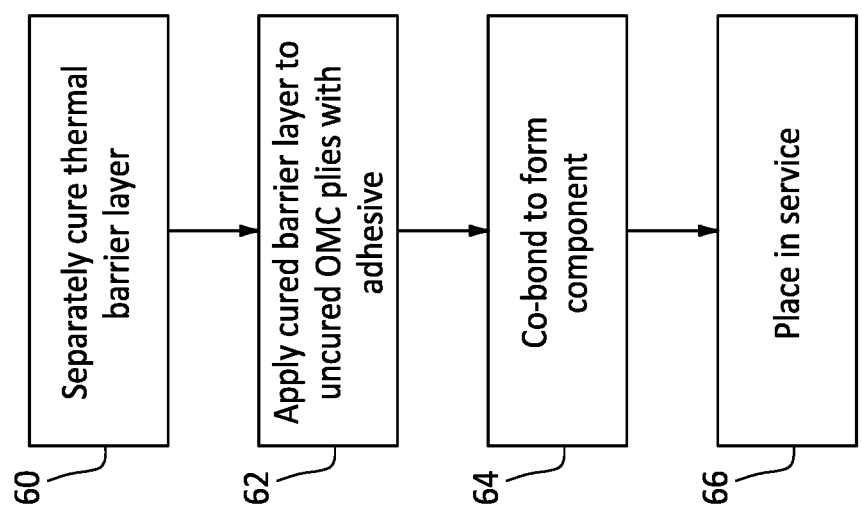
Figure 4:
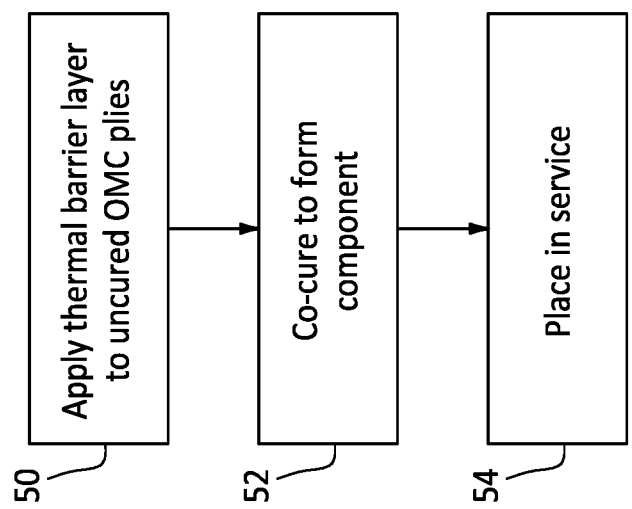

FIGS. 4-6 illustrate in block diagram the steps of methods for applying a thermal barrier layer to an OMC component. In one configuration (FIG. 4), in step 50, an uncured and preceramic thermal barrier layer is placed on the component. In step 52, the component and applied thermal barrier layer are co-cured to form the component, and during this co-curing, the thermal barrier and component are also bonded together. The resulting composite component with thermal barrier layer can then be put into service (step 54), for example in a gas turbine engine where the thermal barrier layer has sufficiently low thermal conductivity that under steady state conditions, the protected OMC component can be exposed to a higher temperature than would otherwise be possible.

In FIG. 5, in step 60, a thermal barrier layer can be separately cured. Then, in step 62, a cured thermal barrier layer is applied to an uncured OMC component. The thermal barrier layer can be applied using an adhesive if desired. Examples of suitable adhesives include BMI based and polyimide based adhesives and the like. The resulting structure can then be co-bonded/cured (step 64) such that the CMC component is formed with the barrier layer applied thereto. The resulting component with thermal barrier layer can then be placed in service (step 66) for example in a gas turbine engine.

In yet another non-limiting configuration, a method can start with the thermal barrier layer and the OMC component being cured separately (step 70). The cured thermal barrier layer can then be applied to the cured component, for example using an adhesive as outlined above (step 72). The combined structure can then be secondarily bonded to form the desired component with thermal barrier layer (step 74), and at that point the component with thermal barrier layer is ready to be placed into service (step 76).

It should be appreciated that while different methods of fabricating a component with thermal barrier layer are described in connection with FIGS. 4-6, other methods could be utilized to produce the end structure well within the scope of this disclosure.

It should be appreciated that the disclosed composite component with thermal barrier layer can advantageously be used to increase the maximum operating temperature of a gas turbine engine, and can be implemented in a manner that has little or no impact a possible tooling line running manufacture of the various components of this disclosure.

The use of the terms "a" and "an" and "the" and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to the normal operational attitude of the vehicle and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit from the subject matter disclosed herein.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed:

1. A gas turbine engine component, comprising:
   a structural component having a surface, the structural component comprising an organic matrix composite material; and
   a cured thermal barrier layer on the surface, wherein the cured thermal barrier layer is a pre-ceramic layer comprising inorganic matrix containing silicon oxides reinforced with glass or quartz fibers, and wherein the pre-ceramic layer comprises a prepreg of glass or quartz fiber reinforced inorganic silicon oxides based matrix.

2. The gas turbine engine component of claim 1, wherein the thermal barrier layer comprises a ply schedule having a continuous layer of pre-ceramic fiber in contact with the surface.

3. The gas turbine engine component of claim 2, wherein the ply schedule defines the thermal barrier layer having zones of different thickness.

4. The gas turbine engine component of claim 1, wherein the thermal barrier layer has a thermal conductivity of less than 0.4 W/mK.

5. The gas turbine engine component of claim 1, wherein the thermal barrier layer has a thermal conductivity of less than 0.35 W/mK.

6. The gas turbine engine component of claim 1, wherein the thermal barrier layer has different thicknesses in different locations on the surface.

7. The gas turbine engine component of claim 1, wherein the surface defines at least a portion of a gas flow path of a gas turbine engine, and wherein the thermal barrier layer is positioned to be in contact with the hot gas flow path.

8. The gas turbine engine component of claim 1, wherein the component comprises a case or duct of a gas turbine engine.

9. The gas turbine engine component of claim 1, wherein the component comprises a gas flow path of a stator.

10. The gas turbine engine component of claim 1, wherein the component comprises a nozzle part of a gas turbine engine.

11. The gas turbine engine component of claim 10, wherein the nozzle part comprises external flaps or a nozzle static structure cover.

12. The gas turbine engine component of claim 1, further comprising a glass or quartz fiber reinforced composite layer between the component and the thermal barrier layer.

13. The gas turbine engine component of claim 1, wherein the organic matrix composite comprises at least one of polyimide composite, bismaleimide composite, and combinations thereof.

14. The gas turbine engine component of claim 1, wherein the organic matrix composite is thermosetting polyimide composite.

* * * * *